United States Patent
Sawanobori

(10) Patent No.: US 11,193,050 B2
(45) Date of Patent: Dec. 7, 2021

(54) LIQUID ADHESIVE COMPOSITION, ADHESIVE SHEET, AND ADHESIVE BONDING METHOD

(71) Applicant: Henkel AG & Co. KGaA, Duesseldorf (DE)

(72) Inventor: Junichi Sawanobori, Kanagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 217 days.

(21) Appl. No.: 16/432,519

(22) Filed: Jun. 5, 2019

(65) Prior Publication Data

US 2019/0284458 A1 Sep. 19, 2019

Related U.S. Application Data

(63) Continuation of application No. PCT/EP2017/080326, filed on Nov. 24, 2017.

(30) Foreign Application Priority Data

Dec. 5, 2016 (EP) ..................................... 16202265

(51) Int. Cl.
C09J 175/16 (2006.01)
C08F 20/28 (2006.01)
C08L 83/06 (2006.01)

(52) U.S. Cl.
CPC .............. *C09J 175/16* (2013.01); *C08F 20/28* (2013.01); *C08L 83/06* (2013.01); *C09J 2301/416* (2020.08)

(58) Field of Classification Search
CPC combination set(s) only.
See application file for complete search history.

(56) References Cited

U.S. PATENT DOCUMENTS

| | | | |
|---|---|---|---|
| 4,446,259 | A | 5/1984 | Du Pont |
| 8,765,833 | B2 | 7/2014 | Igarashi et al. |
| 10,717,907 | B2 | 7/2020 | Wang et al. |
| 2004/0234786 | A1 | 11/2004 | Giraud et al. |
| 2013/0171804 | A1 | 7/2013 | Saito et al. |
| 2015/0004406 | A1 | 1/2015 | Suzuki et al. |
| 2015/0104601 | A1 | 4/2015 | Appeaning et al. |

FOREIGN PATENT DOCUMENTS

| | | |
|---|---|---|
| CN | 1339055 A | 3/2002 |
| CN | 101812278 A | 8/2010 |
| CN | 102399525 A | 4/2012 |
| CN | 102643624 A | 8/2012 |
| CN | 104039909 A | 9/2014 |
| EP | 2 492 298 | 8/2012 |
| EP | 2 522 706 | 11/2012 |
| EP | 3480228 B1 | 6/2021 |
| JP | S55116772 A | 9/1980 |
| JP | 2000 038547 | 2/2000 |
| JP | 2008068404 A | 3/2008 |
| JP | 2013 064075 | 4/2013 |
| JP | 2013064075 A * | 4/2013 |
| JP | 2017538812 A | 12/2017 |
| TW | 201402765 A | 1/2014 |
| WO | 2014/192671 | 12/2014 |
| WO | 2018003981 A1 | 1/2018 |

OTHER PUBLICATIONS

English machine translation of JP2013064075A, prepared May 20, 2021. (Year: 2021).*
International Search Report issued in connection with International Patent Application No. PCT/EP2017/080326 dated Jan. 26, 2018.
Tsai et al., "Synthesis of a Polydimethylsiloxane-block-hydroxyl Grafted Acrylate Prepolymer Copolymer to Improve the Adhesion between Silicone Rubber and Polyurethane by Induced Surface Reconstruction," Journal of Polymer Research vol. 7, No. 2, Jun. 2000, pp. 73-79.
Cao et al., "Synthesis, Characterization and Performances of UV-curable Polysiloxane-modified Polyether Polyurethane Acrylate Prepolymer," Fine Chemicals vol. 32, No. 12, Dec. 2015, pp. 1321-1326.
Liang et al., "Synthesis and Properties of UV/moisture Dual Curable Hyperbranched Polyurethane Coatings," 2009.

* cited by examiner

*Primary Examiner* — Christopher M Rodd
(74) *Attorney, Agent, or Firm* — James E. Piotrowski

(57) ABSTRACT

An object of the present invention is to provide a liquid adhesive composition that, when cured, has a high degree of bond strength and exhibits a relatively constant storage modulus in a wide range of temperatures. A liquid adhesive composition containing (A) an acrylate-functional resin, (B) a hydroxyl-containing (meth)acrylate, and (C) a silicone resin, the acrylate-functional resin (A) having a weight average molecular weight ($M_w$) of 25,000 to 100,000 and a $M_w/M_n$ ratio of 2 or less, and the silicone resin (C) having a weight average molecular weight ($M_w$) of 450 to 2,000 and a silanol content of 0.1 to 5 wt. %, based on the silicone resin (C).

17 Claims, 1 Drawing Sheet

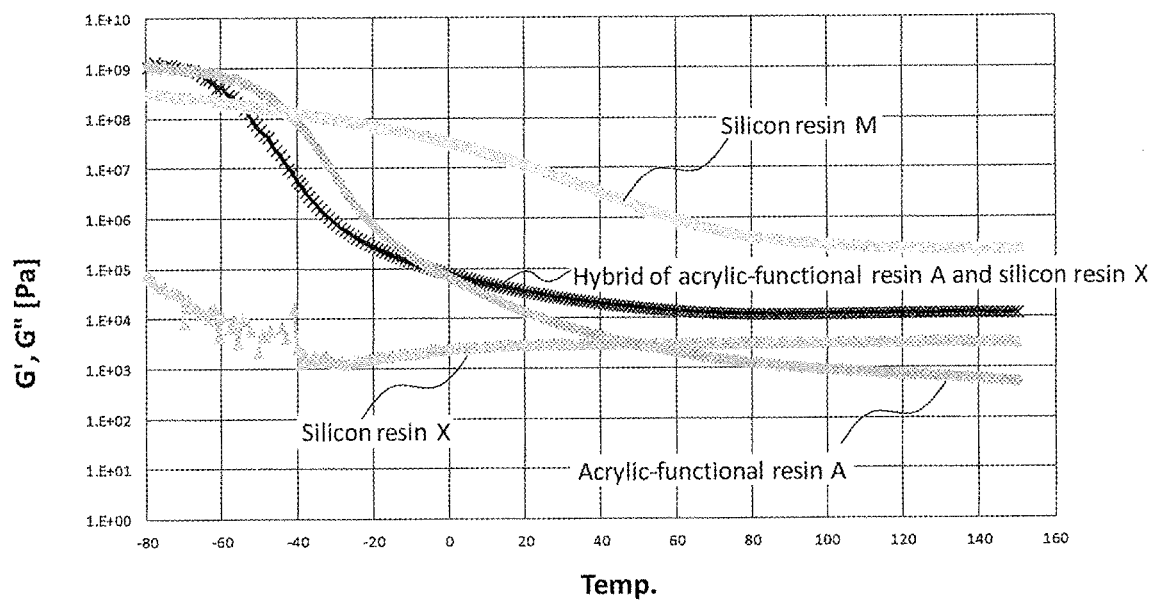

LIQUID ADHESIVE COMPOSITION, ADHESIVE SHEET, AND ADHESIVE BONDING METHOD

TECHNICAL FIELD

The present invention relates to a composition useful as a liquid adhesive, and to an adhesive sheet and an adhesive bonding method.

BACKGROUND

Optically clear adhesives, in particular, optically clear liquid adhesives, are used in a wide variety of applications in optical displays. Optical bonding in display applications is used, for example, to bond flexible films, such as polarizers and retarders, to optical elements, such as display panels, glass plates, touch panels, diffusers, rigid compensators, and heaters. In particular, the use of optically clear adhesives for bonding in touch displays, such as capacitive touch displays, is of high interest. Since the continuous development of new electronic display products, such as wireless reading devices, increases the demand for optically clear adhesives, the importance of optically clear adhesives is still growing.

The application of optical displays is also becoming increasingly diversified. New applications, such as outdoor and wearable applications, have been proposed.

As such an optical liquid adhesive composition, EP 2 522 706A discloses a composition that, when cured, has a main skeleton formed of an acrylic resin. When the main skeleton is formed of an acrylic resin, a high degree of bond strength to the surface of PET film or the like can be provided.

However, in specific applications, cured adhesive compositions must have a relatively constant storage modulus in a wide range of temperatures. Nevertheless, it has been difficult to impart this physical property to a conventional optical liquid adhesive composition that, when cured, has a main skeleton formed of an acrylic resin as disclosed in EP 2 522 706A.

SUMMARY OF INVENTION

Technical Problem

An object of the present invention is to provide a liquid adhesive composition that, when cured, has a high degree of bond strength and exhibits a relatively constant storage modulus in a wide range of temperatures.

Solution to Problem

The present inventor found that the above object can be achieved by a liquid adhesive composition comprising (A) an acrylate-functional resin, (B) a hydroxyl-containing (meth)acrylate, and (C) a silicone resin, the acrylate-functional resin (A) having a weight average molecular weight ($M_w$) of 25000 to 100000 and a $M_w/M_n$ ratio of 2 or less, and the silicone resin (C) having a weight average molecular weight ($M_w$) of 450 to 2000 and a silanol content of 0.1 to 5 wt. %, based on the weight of the silicone resin (C).

The molecular structure of acrylic resin is susceptible to change at a temperature of 50° C. or higher, and it is impossible to maintain a constant storage modulus. The inventor found that this problem can be solved by using a liquid adhesive composition comprising a combination of an acrylate-functional resin having a molecular weight and a molecular weight distribution within specific ranges, a hydroxyl-containing (meth)acrylate, and a silicone resin having a molecular weight within a specific range and a specific silanol content. Specifically, the inventor found that when this liquid adhesive composition is cured, a hybrid resin comprising an acrylic resin and a silicone resin and having a stable molecular structure is obtained. This stabilization of the molecular structure is achieved because hydroxyl groups, which are incorporated into the acrylic resin by a reaction with the hydroxyl-containing (meth)acrylate, react with silanol groups in the silicone resin. This allows the storage modulus of the cured adhesive composition to be relatively constant in a wide range of temperatures, in particular, in the range of 0 to 140° C. Preferably, the cured adhesive composition has a relatively constant storage modulus of less than 1 MPa at 0 to 140° C. Furthermore, the liquid adhesive composition of the present invention, when cured, has a high degree of bond strength because the main skeleton of the hybrid resin is formed of an acrylic resin.

Advantageous Effects of Invention

According to the present invention, a liquid adhesive composition that, when cured, has a high degree of bond strength and exhibits a relatively constant storage modulus in a wide range of temperatures can be provided.

BRIEF DESCRIPTION OF DRAWINGS

FIG. 1 is a graph showing the storage modulus at −80 to 150° C. of the cured film obtained by curing a liquid adhesive composition of the present invention.

DESCRIPTION OF EMBODIMENTS

In the present invention, the term "(meth)acrylate" includes both acrylates and methacrylates.

In the invention, the weight average molecular weight ($M_w$) and number average molecular weight ($M_n$) are determined by gel permeation chromatography (GPC) using polystyrene as a standard.

In the invention, the silanol content (wt. %) of the silicone resin (C) refers to the proportion of the total weight of silanol-containing constituent units, based on the weight of the silicone resin (C). The silanol content (wt. %) of the silicone resin (C) can be determined, for example, by using NMR. Specifically, the silanol content can be calculated from the analysis results of $^1$H-NMR and $^{29}$Si-NMR.

In the invention, the storage modulus is measured in the following manner. Cylindrical cured samples with a diameter of 12 mm and a thickness of 2 mm were prepared. Using a rheometer (MCR302 produced by Anton Paar GmbH or similar product), the measurement is performed at a temperature of −80 to 150° C. in a shear mode at a frequency of 1 Hz.

In the invention, the total light transmittance is measured in the following manner. Using a spectrophotometer (V-660 produced by JASCO or a similar product), the measurement is performed in a wavelength range of 300 to 800 nm using a solid-sample set jig.

1. Liquid Adhesive Composition
1.1 Acrylate-Functional Resin (A)

Since the liquid adhesive composition of the present invention contains an acrylate-functional resin (A), a cured adhesive composition obtained by curing the liquid adhesive composition has a high degree of bond strength.

The acrylate-functional resin (A) may be an acrylate-functional resin having a main skeleton formed of any type of polymer.

Preferable examples of the acrylate-functional resin (A) include acrylate-functional urethane resins, acrylate-functional (poly)ester resins, and acrylate-functional (poly)ether resins.

An acrylate-functional urethane resin may be obtained by reacting a hydroxyl-containing (meth)acrylate with a urethane polymer. An acrylate-functional (poly)ester resin may be obtained by reacting a hydroxyl-containing (meth)acrylate with a (poly)ester polymer. An acrylate-functional (poly)ether resin may be obtained by reacting a hydroxyl-containing (meth)acrylate with a (poly)ether polymer.

As the acrylate-functional resin (A), an acrylate-functional urethane resin is the most preferable.

It is important in view of the molecular-structure-stabilizing effect that the acrylate-functional resin (A) has a weight average molecular weight ($M_w$) of 25000 or more and a $M_w/M_n$ ratio of 2 or less.

It is preferable in view of providing the molecular-structure-stabilizing effect that the acrylate-functional resin (A) has a weight average molecular weight ($M_w$) of 27000 or more, more preferably 29000 or more, and even more preferably 30000 or more.

The acrylate-functional resin (A) is typically selected from those having a molecular weight of 100000 or less. In view of ease of imparting appropriate clearness to the cured adhesive composition, the acrylate-functional resin (A) preferably has a molecular weight of 80000 or less, more preferably 60000 or less, and even more preferably 40000 or less.

The weight average molecular weight ($M_w$) range of the acrylate-functional resin (A) may be any combination of the lower limit and the upper limit described above. The weight molecular weight range is not particularly limited and may be, for example, 27000 to 80000, 28000 to 60000, or 29000 to 40000.

It is preferable in view of providing the molecular-structure-stabilizing effect that the acrylate-functional resin (A) has a $M_w/M_n$ ratio of 1.8 or less.

The acrylate-functional resin (A) has a $M_w/M_n$ ratio of 1 or more, preferably a $M_w/M_n$ ratio of 1.2 or more, more preferably a $M_w/M_n$ ratio of 1.3 or more, and even more preferably a $M_w/M_n$ ratio of 1.5 or more.

The $M_w/M_n$ ratio of the acrylate-functional resin (A) may be any combination of the lower limit and the upper limit described above. The $M_w/M_n$ ratio is not particularly limited and may be, for example, 1 to 2, or 1.2 to 1.8.

The acrylate-functional resin (A) can be used singly or in a combination of two or more of such resins.

The acrylate-functional resin (A) used herein can be obtained commercially from various vendors. The acrylate-functional resin (A) can be manufactured in accordance with commonly known methods. Examples of such commercially available acrylate-functional resin include UF-07DF and UF-C02 (acrylate-functional urethane resins, produced by Kyoeisha Chemical Co., Ltd.).

1.2 Hydroxyl-Containing (Meth)Acrylate (B)

The liquid adhesive composition of the present invention further contains a hydroxyl-containing (meth)acrylate (B). In the process of curing the liquid adhesive composition of the present invention, an acrylate-functional resin (A) reacts with a hydroxyl-containing (meth)acrylate (B) to produce a hydroxyl-containing acrylic resin. The cured adhesive composition comprises a hybrid resin of the hydroxyl-containing acrylic resin and a silanol-containing silicone resin (C) described below. In this hybrid resin, hydroxyl groups react with silanol groups to stabilize the molecular structure. This allows the storage modulus of the cured adhesive composition to be relatively constant in a wide range of temperatures.

The liquid adhesive composition of the present invention may comprise one or more types of hydroxyl-containing (meth)acrylates (B).

In view of the molecular-structure-stabilizing effect, the (meth)acrylate (B) is preferably a (meth)acrylate wherein the ester moiety is a terminally hydroxylated hydrocarbon group that is optionally substituted with one or more heteroatoms. Examples of heteroatoms include nitrogen, oxygen, sulfur, and the like.

The terminally hydroxylated hydrocarbon group may be saturated or unsaturated. The hydrocarbon group may be linear, branched, or cyclic, or may have a combination of two or more of such structures.

The terminally hydroxylated hydrocarbon group preferably contains 3 to 5 carbon atoms, and more preferably 4 carbon atoms, in view of the molecular-structure-stabilizing effect.

The terminally hydroxylated hydrocarbon group is preferably terminally hydroxylated alkyl, and more preferably terminally hydroxylated linear alkyl, in view of the molecular-structure-stabilizing effect.

The terminally hydroxylated hydrocarbon group is preferably a terminally hydroxylated $C_{3-5}$ alkyl group, more preferably terminally hydroxylated butyl, and even more preferably terminally hydroxylated n-butyl, in view of providing the molecular-structure-stabilizing effect.

The liquid adhesive composition of the present invention preferably contains one or more hydroxyl-containing (meth)acrylates (B) in a total amount of 0.1 to 100 parts by weight, more preferably 0.5 to 50 parts by weight, and even more preferably 1 to 10 parts by weight, relative to 100 parts by weight of the acrylate-functional resin (A).

The hydroxyl-containing (meth)acrylate (B) used herein can be obtained commercially from various vendors.

1.3. Hydroxyl-Free (Meth)Acrylate

The liquid adhesive composition of the present invention may further contain one or more hydroxyl-free (meth)acrylates. For example, the above (meth)acrylate monomer (a) may be used as such a hydroxyl-free (meth)acrylate. Examples of hydroxyl-free (meth)acrylates include polyfunctional hydroxyl-free acrylates. Preferably, at least one polyfunctional hydroxyl-free acrylate is used as a hydroxyl-free (meth)acrylate. Examples of polyfunctional acrylates include dimethyloltricyclodecane diacrylate, 1,4-butanediol acrylate, 1,6-hexanediol acrylate, 1,9-nonanediol acrylate, tripropylene glycol diacrylate, tricyclodecane dimethanol diacrylate, 1,10-decanediol diacrylate, polyethylene glycol diacrylate wherein the polyethylene glycol has a molecular weight of 200, polyethylene glycol diacrylate wherein the polyethylene glycol moiety has a molecular weight of 400, polyethylene glycol diacrylate wherein the polyethylene glycol moiety has a molecular weight of 600, trimethylolpropane triacrylate, ditrimethylolpropane tetraacrylate, ethoxylated pentaerythritol tetraacrylate, pentaerythritol tetraacrylate, dipentaerythritol hexaacrylate, and the like.

To enhance, for example, close contact between a substrate surface and the liquid adhesive composition of the present invention, (meth)acrylate wherein the ester moiety is a branched hydrocarbon group can be used as a hydroxyl-free (meth)acrylate. Examples of such (meth)acrylates include 2-ethylhexyl acrylate and the like.

The liquid adhesive composition of the present invention preferably contains one or more hydroxyl-free (meth)acrylates in a total amount of 1 to 10000 parts by weight, more preferably 10 to 1000 parts by weight, and even more preferably 50 to 200 parts by weight, relative to 100 parts by weight of the acrylate-functional resin (A).

The hydroxyl-free (meth)acrylate used herein can be obtained commercially from various vendors.

14. Silicone Resin (C)

The silicone resin (C) is composed of a combination of different types of silanes, which are unit M (mono-branched), unit D (double-branched), unit T (triple-branched), and unit Q (quadruple-branched). Examples of the silicone resin (C) include DT, MQ, MDT, DTQ, MDQ, MTQ, and MDTQ resins. Among these, MQ resin, DT resin, and MDQ resin are particularly preferable as the silicone resin (C).

Unit M (mono-branched) is represented by the formula $R_3SiO$, wherein each R may be the same or different and independently represents a substituted or unsubstituted hydrocarbon group or a silanol group. The hydrocarbon group may have one or more oxygen atoms, sulfur atoms, nitrogen atoms, ester bonds, amide bonds, carbonyl groups, and the like as substituents. The hydrocarbon group may be saturated or unsaturated. The hydrocarbon group may be linear, branched, or cyclic, or may have a combination of two or more of such structures.

The hydrocarbon group may contain 1 to 40 carbon atoms, 1 to 30 carbon atoms, 1 to 20 carbon atoms, 1 to 10 carbon atoms, or 1 to 6 carbon atoms. Examples of the hydrocarbon group include alkyl groups, alkenyl groups, aryl groups, arylalkyl groups, and the like. Examples of alkyl groups include methyl, ethyl, n-propyl, isopropyl, n-butyl, t-butyl, and the like. Preferable alkyl groups are, for example, ethyl, n-propyl, isopropyl, and n-butyl. Examples of alkenyl groups include vinyl, allyl, 1-butenyl, 1-hexenyl, and the like. Preferable alkenyl groups are, for example, vinyl and allyl. Examples of aryl groups include phenyl, tolyl, xylyl, and the like. A preferable aryl group is, for example, phenyl. Examples of arylalkyl groups include benzyl, 1-phenylethyl, 2-phenylethyl, and the like. A preferable arylakyl group is, for example, benzyl.

Unit D (double-branched) is represented by formula $R_2SiO_2$ (wherein the definition of R is the same as in the above definition of unit M).

Unit T (triple-branched) is represented by formula $R_1SiO_3$ (wherein the definition of R is the same as in the above definition of unit M).

Unit Q (quadruple-branched) is represented by formula $SiO_4$.

For example, MQ resin is represented by formula $(R_3Si_O)_c(SiO_4)_d$ (wherein c and d are integers).

For example, DT resin is represented by formula $(R_2SiO_2)_a(R_1SiO_3)_b$ (wherein a and b are integers).

Other resins, such as MDT, DTQ, MDQ, MTQ, and MDTQ resins, can also be similarly represented by general formulas.

In view of enabling the liquid adhesive composition of the present invention to be cured by UV light, the silicone resin (C) preferably contains at least one type of radical polymerizable group. Preferable examples of the radical polymerizable group include an acrylic group and an epoxy group.

It is important in view of the molecular-structure-stabilizing effect that the silicone resin (C) has a weight average molecular weight ($M_w$) of 450 or more and a silanol content of 5 mol % or less.

It is preferable in view of providing the molecular-structure-stabilizing effect that the silicone resin (C) has a weight molecular weight of 470 or more, and more preferably 500 or more.

The silicone resin (C) is typically selected from those having a weight molecular weight of 2000 or more. In view of easily imparting appropriate clearness to the cured adhesive composition, the molecular weight is preferably 1500 or less, and more preferably 1000 or less.

The weight average molecular weight ($M_w$) range of the silicone resin (C) may be any combination of the lower limit and the upper limit described above. The average molecular weight range is not particularly limited, and may be, for example, 450 to 2000, 470 to 1500, 500 to 1000, and the like.

The silanol content of the silicone resin (C) is preferably 0.1 to 5 wt. %, more preferably 0.5 to 4 wt. %, and even more preferably 1 to 3 wt. %, based on the silicone resin (C) in view of providing the molecular-structure-stabilizing effect.

It is preferable in view of providing the molecular-structure-stabilizing effect that the liquid adhesive composition of the present invention contain the silicon resin (C) in an amount of 0.5 to 500 parts by weight, more preferably 1 to 100 parts by weight, and even more preferably 2 to 50 parts by weight, relative to 100 parts by weight of the acrylate-functional resin (A).

The silicon resin (C) may be used singly or in a combination of two or more such resins.

The silicone resin (C) used herein can be obtained commercially from various vendors. The silicone resin (C) can be manufactured in accordance with commonly known methods. Examples of such commercially available silicone resin include KR-513 (silicone resin substituted with silanol and acrylic groups, produced by Shin-Etsu Chemical Co., Ltd.).

1.5. Solvent

The liquid adhesive composition of the present invention may contain at least an acrylate-functional resin (A), a hydroxyl-containing (meth)acrylate (B), and a silicone resin (C) in a solvent.

Specifically, the liquid adhesive composition of the present invention may be obtained by diluting at least an acrylate-functional resin (A), a hydroxyl-containing (meth)acrylate (B), and a silicone resin (C) with a solvent to achieve an appropriate viscosity.

Examples of solvents include aliphatic hydrocarbon solvents such as n-hexane and n-heptane; aromatic hydrocarbon solvents such as benzene and toluene; ketone solvents such as methyl ethyl ketone; and the like.

Such solvents may be used singly or in combination of two or more.

The total amount of the acrylate-functional resin (A), hydroxyl-containing (meth)acrylate (B), and silicone resin (C) in the solvent is preferably 30 to 95 wt. %, more preferably 50 to 85 wt. %, and even more preferably 65 to 80 wt. %.

1.6. Other Components

The liquid adhesive composition of the present invention may contain other components in addition to the acrylate-functional resin (A), hydroxyl-containing (meth)acrylate (B), and silicone resin (C). Examples of other components include crosslinking agents, plasticizers, antistatic agents, tackifiers, softeners, colorants, antioxidants, leveling agents, stabilizers, preservatives, and the like. Such other components may be incorporated into the liquid adhesive composition of the present invention singly or in a combination of two or more.

2. Cured Adhesive Composition

The liquid adhesive composition of the present invention is cured to obtain a cured adhesive composition. The liquid adhesive composition of the present invention is typically applied to a substrate surface and irradiated with UV light. Ultraviolet light in a wavelength range of 200 to 420 nm can be used as the UV light. At the time of curing, if necessary, acrylate-functional resins (A) may be crosslinked with each other, or acrylate functional resin (A) may be crosslinked with silicone resin (C). The crosslinking can be achieved by the action of a crosslinking agent contained in the liquid adhesive composition, or a crosslinking agent may be added to the liquid adhesive composition to effect crosslinking.

It is preferable that the liquid adhesive composition of the present invention, when cured, be optically clear because such a composition can be used for optical applications. Specifically, the cured adhesive composition preferably has a total light transmittance of 85% or more, more preferably 90% or more, and even more preferably 95% or more.

The cured adhesive composition preferably has an storage modulus of less than 1 MPa at 0 to 140° C.

The liquid adhesive composition of the present invention is such that when the liquid adhesive composition is cured, the resulting cured adhesive resin composition exhibits a relatively constant storage modulus in a wide range of temperatures and has a high degree of bond strength. Therefore, the liquid adhesive composition of the invention is suitable, for example, for flexible display applications, such as outdoor and wearable applications.

The present invention also relates to a use of the liquid adhesive composition of the present invention as an optical adhesive, preferably as an optical adhesive for flexible display applications.

3. Adhesive Sheet

The adhesive sheet of the present invention is obtainable by applying the liquid adhesive composition explained above in section 1 to at least one side of a substrate directly or over another layer on the substrate and then curing the composition by UV irradiation to form a cured adhesive composition layer.

Examples of the substrate include plastic films.

Examples of plastic films include films formed of resins, such as polypropylene, ethylene-propylene copolymers, polyvinyl chloride, polyethylene terephthalate, polybutylene terephthalate, polycarbonate, and polyarylate.

The side of the substrate on which the cured adhesive composition layer is formed may be release-treated. Examples of the release treatment include silicone treatment, fluorine treatment, and the like.

The liquid adhesive composition may be applied to the substrate surface by, for example, using a coater. Examples of coaters include gravure roll coaters, reverse roll coaters, kiss roll coaters, dip roll coaters, bar coaters, knife coaters, spray coaters, and the like.

From the viewpoint of promoting the crosslinking reaction or manufacturing efficiency, the liquid adhesive composition diluted with a solvent is preferably dried while heating. The drying temperature may be, for example, 40 to 150° C.

The thickness of the cured adhesive composition layer is not particularly limited and can be typically adjusted to 10 to 250 μm.

Preferably, the adhesive sheet is optically clear because such a sheet can find optical applications. More specifically, regarding the clearness, the adhesive sheet preferably has a total light transmittance of 85% or more, more preferably 90% or more, and even more preferably 95% or more.

The cured adhesive composition of the present invention exhibits a relatively constant storage modulus in a wide range of temperatures and has high bond strength. Therefore, the adhesive sheet of the present invention comprising a layer formed of the cured adhesive composition of the present invention is suitable, for example, for flexible display applications, such as outdoor and wearable applications.

The present invention also relates to a use of the adhesive sheet of the present invention as an optical adhesive sheet, preferably as an optical adhesive sheet for flexible display applications.

EXAMPLES

The present invention is explained below in more detail with reference to Examples and Comparative Examples. However, the scope of the invention is not limited to the Examples. In the Examples and Comparative Examples below, parts are all by weight, unless otherwise specified.

Tables 1 and 2 show three types of acrylate-functional resins and three types of silicone resins used in the Examples or the Comparative Examples.

TABLE 1

| | Weight average molecular weight | Molecular weight distribution |
|---|---|---|
| Acrylate-functional resin A (acrylate-functional urethane resin) | 30000 | 1.7 |
| Acrylate-functional resin B (acrylate-functional urethane resin) | 30000 | 2.5 |
| Acrylate-functional resin C (acrylate-functional urethane resin) | 20000 | 1.7 |

TABLE 2

| | Weight average molecular weight | Silanol group (wt. %) |
|---|---|---|
| Silicone resin X (acrylate-functional silicone resin) | 500 | 3 |
| Silicone resin Y (acrylate-functional silicone resin) | 400 | 3 |
| Silicone resin Z (acrylate-functional silicone resin) | 500 | 6 |

Example 1

As photoinitiators, 1.2 parts of 2,4,6-trimethylbenzoyl diphenyl phosphine oxide (trade name Irgacure TPO, produced by BASF) and 0.6 parts of a phenyl glyoxylic acid methyl ester (trade name Irgacure MBF, produced by BASF) were added to 43.8 parts of a resin mixture of acrylate-functional resin A and silicone resin X (A:X=90:10 (weight ratio)). As light stabilizers, 0.4 parts of a hydroxyphenyl triazine UV absorber (trade name Tinuvin 477, produced by BASF) and 0.2 parts of a benzotriazole UV absorber (trade name Tinuvin 326, produced by BASF) were added. As a defoaming agent, 0.2 parts of a solution of foam destroying polymers and polysiloxanes (trade name BYK-088, produced by BYK-Chemie) was added. As monomers, 2.0 parts of 4-hydroxybutyl acrylate (trade name 4-HBA, produced by Osaka Organic Chemical Industry, Ltd.), 0.2 parts of dimethylol tricyclodecane diacrylate (trade name DCP-A, produced by Kyoeisha Chemical Co., Ltd.), 6.4 parts of n-octyl acrylate (trade name NOAA, produced by Osaka Organic Chemical Industry, Ltd.), and 25.1 parts of 2-ethylhexyl acrylate (trade name 2EHA, produced by Nippon Shokubai Co., Ltd.) were added. As a tackifier, 19.9 parts of a terpene phenol copolymer (trade name YS Polyster TH130, produced by Yasuhara Chemical Co., Ltd.) was added. The liquid obtained by adding these components was fully stirred and mixed to produce a liquid adhesive composition.

Example 2

A liquid adhesive composition was obtained in the same manner as in Example 1 except that a resin mixture of acrylate functional resin A and silicone resin X (A:X=95:5 (weight ratio)) was used.

Example 3

A liquid adhesive composition was obtained in the same manner as in Example 1 except that a resin mixture of acrylate-functional resin A and silicone resin X (A:X=80:20 (weight ratio)) was used.

Example 4

A liquid adhesive composition is obtained in the same manner as in Example 1 except that a resin mixture of acrylate-functional urethane resin (trade name UF-07DF, produced by Kyoeisha Chemical Co., Ltd.) and silicone resin substituted with silanol and acrylic groups (trade name KR-513, produced by Shin-Etsu Chemical Co., Ltd.) (acrylate-functional resin:silicon resin=90:10 (weight ratio)) is used.

Comparative Example 1

A liquid adhesive composition was obtained in the same manner as in Example 1 except that a resin mixture of acrylate-functional resin B and silicone resin X (B:X=90:10 (weight ratio)) was used.

Comparative Example 2

A liquid adhesive composition was obtained in the same manner as in Example 1 except that 4-hydroxybutyl acrylate was not added as a monomer.

Comparative Example 3

A liquid adhesive composition was obtained in the same manner as in Example 1 except that a resin mixture of acrylate-functional resin C and silicone resin X (C:X=90:10 (weight ratio) was used.

Comparative Example 4

A liquid adhesive composition was obtained in the same manner as in Example 1 except that a resin mixture of acrylate-functional resin A and silicone resin Y (A:Y=90:10 (weight ratio)) was used.

Comparative Example 5

A liquid adhesive composition was obtained in the same manner as in Example 1 except that a resin mixture of acrylate-functional resin B and silicone resin Y (B:Y=90:10 (weight ratio)) was used.

Comparative Example 6

A liquid adhesive composition was obtained in the same manner as in Example 1 except that a resin mixture of acrylate-functional resin A and silicone resin Y (A:Y=90:10 (weight ratio)) was used and that 4-hydroxybutyl acrylate was not added as a monomer.

Comparative Example 7

A liquid adhesive composition was obtained in the same manner as in Example 1 except that a resin mixture of acrylate-functional resin C and silicone resin Y (C:Y=90:10 (weight ratio)) was used.

Comparative Example 8

A liquid adhesive composition was obtained in the same manner as in Example 1 except that a resin mixture of acrylate-functional resin A and silicone resin Z (A:Z=90:10 (weight ratio) was used.

Table 3 shows the types of resins and proportions of acrylate functional resin and silicon resin contained in the resin mixtures used in the Examples.

TABLE 3

| | Ex. 1 | Ex. 2 | Ex. 3 | Comp. Ex. 1 | Com. Ex. 2 | Comp. Ex. 3 | Com. Ex. 4 | Comp. Ex. 5 | Comp. Ex. 6 | Comp. Ex. 7 | Com. Ex. 8 |
|---|---|---|---|---|---|---|---|---|---|---|---|
| Acrylate-functional resin A | 90 | 95 | 80 | | 90 | | 90 | | 90 | | 90 |
| Acrylate-functional resin B | | | | 90 | | | | 90 | | | |
| Acrylate-functional resin C | | | | | | 90 | | | | 90 | |
| Silicone resin X | 10 | 5 | 20 | 10 | 10 | 10 | | | | | |

TABLE 3-continued

|  | Ex. 1 | Ex. 2 | Ex. 3 | Comp. Ex. 1 | Com. Ex. 2 | Comp. Ex. 3 | Com. Ex. 4 | Comp. Ex. 5 | Comp. Ex. 6 | Comp. Ex. 7 | Com. Ex. 8 |
|---|---|---|---|---|---|---|---|---|---|---|---|
| Silicone resin Y |  |  |  |  |  |  | 10 | 10 | 10 | 10 |  |
| Silicone resin Z |  |  |  |  |  |  |  |  |  |  | 10 |

Each of the liquid adhesive compositions obtained in Examples 1 to 3 and Comparative Examples 1 to 8 was applied to a first sheet of a release liner. A second sheet of a release liner was further overlaid on the coating layer. The coating layer was irradiated with UV light at an intensity of about 200 mW/cm$^2$ and a dose of about 2000 mJ/cm$^2$ to form a cured adhesive layer having a thickness of 50 μm, thus obtaining a double-sided adhesive sheet. As the release liners, 38-μm-thick and 75-μm-thick polyethylene phthalate (PET) films whose surface in contact with the adhesive layer was treated with a silicone release agent were used.

The adhesive layers thus obtained were subjected to a 180° peel strength test in the following manner.

A 50-μm-thick PET film (not release-treated) was attached to a first adhesive surface, which was exposed by releasing the first release liner from each adhesive sheet. The resulting product was cut to a width of 25 mm to prepare a test piece. After the second release liner was released from the test piece, the resulting product was pressure-bonded to a 50-μm-thick PET film (not release-treated) by one rotation of a 2-kg roller on it. After the pressure-bonded test piece was maintained at 25° C. for 1 day, peel strength (N/25 mm) against the 50-μm-thick PET film (not release-treated) was measured at a tensile speed of 300 mm/min and a peel angle of 180° using a tensile tester.

The storage modulus of each adhesive layer was measured in the following manner. Cylindrical cured samples with a diameter of 12 mm and a thickness of 2 mm were prepared. Using a rheometer (MCR302 produced byAnton Paar GmbH), the measurement was performed at a temperature of −80 to 150° C. in a shear mode at a frequency of 1 Hz.

Table 4 shows the measurement results as well as the appearance observation results. The storage modulus shown in Table 4 is the results of measurement at 80° C.:

by curing the liquid adhesive composition of the present invention has an almost constant storage modulus in a wide range of temperatures.

What is claimed is:

1. A liquid adhesive composition comprising:
   (A) an acrylate functional resin,
   (B) a hydroxyl-containing (meth)acrylate, and
   (C) a silicone resin,
the acrylate-functional resin (A) having a weight average molecular weight ($M_w$) of 25000 to 100000 and a $M_w/M_n$ ratio of 2 or less, and the silicone resin (C) having a weight average molecular weight ($M_w$) of 450 to 2000 and a silanol content of 0.1 to 5 wt. %, based on the silicone resin (C).

2. The liquid adhesive composition according to claim 1, wherein the (meth)acrylate (B) is present in an amount of 0.1 to 100 parts by weight relative to 100 parts by weight of the acrylate functional resin (A).

3. The liquid adhesive composition according to claim 1, wherein the (meth)acrylate (B) is a (meth)acrylate monomer wherein the ester moiety is a terminally hydroxylated hydrocarbon group that is optionally substituted with one or more heteroatoms.

4. The liquid adhesive composition according to claim 3, wherein the terminally hydroxylated hydrocarbon group in the (meth)acrylate (B) contains 3 to 5 carbon atoms.

5. The liquid adhesive composition according to claim 3, wherein the terminally hydroxylated hydrocarbon group in the (meth)acrylate (B) is terminally hydroxylated alkyl.

6. The liquid adhesive composition according to claim 1, wherein the silicone resin (C) is present in an amount of 0.5 to 500 parts by weight relative to 100 parts by weight of the acrylate-functional resin (A).

7. The liquid adhesive composition according to claim 1, wherein the silicone resin (C) comprises at least one silicone

TABLE 4

|  | Ex. 1 | Ex. 2 | Ex. 3 | Comp Ex. 1 | Comp Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| 180° peel strength test | 853 | 940 | 700 | 355 | 133 | 449 | 649 | 157 | 125 | 30 | Cloudy |
| Storage modulus | 2.0E+04 | 3.0E+04 | 4.5E+04 | 7.0E+03 | 6.0E+03 | 7.0E+03 | 8.0E+03 | 6.0E+03 | 5.0E+03 | 4.0E+03 |  |
| Appearance | Clear | Clear | Clear | Clear | Clear | Clear | Slightly cloudy | Slightly cloudy | Slightly cloudy | Slightly cloudy |  |
| Comprehensive judgment | Good | Good | Good | NG | NG | NG | NG | NG | NG | NG | NG |

Further, FIG. 1 shows the storage modulus at −80 to 150° C. of the cured film obtained by curing the liquid adhesive composition obtained in Example 1. FIG. 1 also shows the measurement results of cured films obtained by individually curing acrylate-functional resin A, silicone resin X, and silicone resin M (trade name SD4584, produced by Toray Dow Inc.) alone in the same manner as curing the liquid adhesive composition of the present invention. As shown in FIG. 1, the results clearly show that the cured film obtained resin selected from the group consisting of acrylate-functional silicone resins and epoxy-functional silicone resins.

8. The liquid adhesive composition according to claim 1, wherein the adhesive composition, when cured, has a storage modulus of less than 1 MPa in a temperature range of 0 to 140° C.

9. The liquid adhesive composition according to claim 1, wherein the adhesive composition, when cured, is optically clear.

10. The liquid adhesive composition according to claim 1, wherein the adhesive composition, when cured, has a total light transmittance of 85% or more.

11. An optical adhesive comprising the liquid adhesive composition according to claim 1 as an optical adhesive.

12. A cured adhesive composition obtainable by curing the liquid adhesive composition according to claim 1.

13. A method for bonding an article using the liquid adhesive composition according to claim 1, the method comprising:
   (1) applying the liquid adhesive composition to at least a surface of a first article and curing the composition to form a cured adhesive composition; and
   (2) adhesively bonding the cured adhesive composition obtained in step (1) to a second article.

14. An adhesive sheet comprising a cured adhesive layer obtainable by curing the liquid adhesive composition according to claim 1.

15. The adhesive sheet according to claim 14, which is optically clear.

16. The adhesive sheet according to claim 14, which has a total light transmittance of 85% or more.

17. The adhesive sheet according to claim 14 as an optical adhesive sheet.

* * * * *